(12) United States Patent
Cardell et al.

(10) Patent No.: US 9,230,023 B2
(45) Date of Patent: Jan. 5, 2016

(54) SEARCH SUGGESTION AND DISPLAY ENVIRONMENT

(71) Applicant: Google Inc., Mountain View, CA (US)

(72) Inventors: Lena Elizabeth Cardell, San Francisco, CA (US); Timothy R. Schoen, San Francisco, CA (US); Christine Soriano, Milpitas, CA (US); Donald O. Tanguay, Cambridge, MA (US); David Bau, Lincoln, MA (US); Francis Carr, Lynn, MA (US); Nikhil Shivaji Thorat, Northborough, MA (US); Timothy E. Denehy, Boston, MA (US)

(73) Assignee: Google Inc., Mountain View, CA (US)

( * ) Notice: Subject to any disclaimer, the term of this patent is extended or adjusted under 35 U.S.C. 154(b) by 407 days.

(21) Appl. No.: 13/863,882

(22) Filed: Apr. 16, 2013

(65) Prior Publication Data

US 2014/0310255 A1 Oct. 16, 2014

(51) Int. Cl.
*G06F 7/00* (2006.01)
*G06F 17/30* (2006.01)

(52) U.S. Cl.
CPC .... *G06F 17/30864* (2013.01); *G06F 17/30268* (2013.01); *G06F 17/30277* (2013.01); *G06F 17/30643* (2013.01)

(58) Field of Classification Search
CPC ............... G06F 17/30864; G06F 17/30277; G06F 17/30643; G06F 17/30268
See application file for complete search history.

(56) References Cited

U.S. PATENT DOCUMENTS

| 2007/0016575 | A1* | 1/2007 | Hurst-Hiller et al. | 707/5 |
|---|---|---|---|---|
| 2007/0174790 | A1* | 7/2007 | Jing et al. | 715/838 |
| 2009/0144234 | A1 | 6/2009 | Sharif et al. | |
| 2009/0144240 | A1* | 6/2009 | Singh et al. | 707/3 |
| 2010/0205202 | A1* | 8/2010 | Yang et al. | 707/767 |
| 2011/0179021 | A1 | 7/2011 | Wen et al. | |
| 2011/0208730 | A1* | 8/2011 | Jiang et al. | 707/727 |
| 2012/0078963 | A1 | 3/2012 | Dantzig et al. | |

OTHER PUBLICATIONS

International Search Report and Written Opinion in International Application No. PCT/US2014/033789, mailed Aug. 14, 2014, 9 pages.

(Continued)

*Primary Examiner* — Azam Cheema
(74) *Attorney, Agent, or Firm* — Fish & Richardson P.C.

(57) ABSTRACT

Methods, systems, and apparatus for processing image content items. In one aspect, a method includes receiving a set of search query suggestions for a query, each search query suggestion being based on the search query; for each search query suggestion, receiving data identifying a respective set of resources determined to be responsive to the search query suggestion; for each respective set of resources, generating a representative resource set depicting a subset of the respective set of resources; providing to the user device, in response the search query, a search results page resource including instructions that cause the user device to render a search results page that includes: a set of search results that identify resources that are determined to be responsive to the search query; for each search query suggestion, a search query suggestion grouping including: data describing the search query suggestion, and data depicting the representative resource set.

10 Claims, 7 Drawing Sheets

(56) References Cited

OTHER PUBLICATIONS

Puppies—Bing Images [online], 2013 [retrieved on Jul. 10, 2013]. Retrieved from Internet <http://www.bing.com/images/search?q=puppies#a[Jul. 10, 2013 2:41:28 PM], 2 pages.

McCarty, B., "Apple introduces iTunes 11, touting 29 billion song purchases across 63 countries" 2012 (online). [Retrieved on May 17, 2013]. Retrieved from the internet: http://thenextweb.com/apple/2012/09/12/apple-introduces-itunes-11-touting-29-billion-song-purchases-across-63-countries/>, 3 pages.

Google "in iTunes 11" Images (online). [Retrieved on May 17, 2013] Retrieved from the internet: https://www.google.com/search?q=in+iTunes+11&rls=com.microsoft:en-us:IE-Address&rlz=1I7GGNI_enUS489&source=lnms&tbm=isch&sa=X&ei=wEqVUZ_JK4Ls8gT6vICY Ba&ved=0CAoQ_AUoAQ&biw=1437 &bih=814#imgrc=bBbDI9vNHRFo6M%3A%3BC7laZNUMNwuy2M%3Bhttp%-253A%252F%252Fcdn.slashgear.com%252Fwp-content%252Fuploads%252F2012%252F11%252Fsg_itunes_111.jpg%3Bhttp%253A%252F%252F www.slashgear.com%252Fitunes-11-launches-with-complete-ui-redesign-and-icloud-abundance-29258959%252F%3B1090%3B714, 11 pages.

\* cited by examiner

SEARCH SUGGESTION AND DISPLAY ENVIRONMENT

BACKGROUND

This specification relates to information presentation.

The Internet provides access to a wide variety of resources. For example, digital image files, video and/or audio files, as well as webpages for particular subjects or particular news articles, are accessible over the Internet. Each of these digital files and webpages are generally referred to as a resource. A search engine can identify resources in response to a user query that includes one or more search terms or phrases. The search engine ranks the resources based on their relevance to the query and importance and provides search results that link to the identified resources, and orders the search results according to the rank.

For example, digital images that satisfy a user's informational need can be identified by an image search process in which keywords or other data are processed to identify collections of digital images. Each image is identified to the user by an image search result. An image search result references a corresponding image resource that a search engine determines to be responsive to a search query, and typically includes a representative image of the image resource, such as a thumbnail. The image search result also references a webpage resource that includes the image resource.

SUMMARY

In general, one innovative aspect of the subject matter described in this specification can be embodied in methods that include the actions of receiving, in response to a search query for resources received from a user device, a set of search query suggestions, each search query suggestion being based on the search query and different from the search query; for each search query suggestion, receiving data identifying a respective set of resources determined to be responsive to the search query suggestion; for each respective set of resources, generating a representative resource set depicting a subset of the respective set of resources; providing to the user device, in response the search query, a search results page resource, the search results page resource including instructions that cause the user device to render a search results page that includes: a set of search results that identify resources that are determined to be responsive to the search query, for each search query suggestion, a search query suggestion grouping including: data describing the search query suggestion and data depicting the representative resource set. Other embodiments of this aspect include corresponding systems, apparatus, and computer programs, configured to perform the actions of the methods, encoded on computer storage devices.

Another innovative aspect of the subject matter described in this specification can be embodied in methods that include the actions of receiving, in response to a search query for resources received from a user device, a set of search query suggestions, each search query suggestion being based on the search query and different from the search query; for each search query suggestion, receiving data identifying a respective set of resources determined to be responsive to the search query suggestion; for each respective set of resources, generating a representative resource set depicting a subset of the respective set of resources; providing to the user device, in response the search query, a search results page resource, the search results page resource including instructions that cause the user device to render a search results page that includes: a set of search results that identify resources that are determined to be responsive to the search query, for each search query suggestion, a search query suggestion grouping including: data describing the search query suggestion, and data depicting the representative resource set. Other embodiments of this aspect include corresponding systems, apparatus, and computer programs, configured to perform the actions of the methods, encoded on computer storage devices. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the actions.

Particular embodiments of the subject matter described in this specification can be implemented so as to realize one or more of the following advantages. Displaying a query suggestion grouping for each query suggestion provides users with a representative resource context for the query suggestion, which facilitates a visual analysis of the context of the query suggestion. Such visual analysis of the context can help users discern whether the search suggestion will help satisfy information needs.

Additionally, a user can quickly review a number of search results for a query suggestion in the context of other search results for the query to decide which set of search results best satisfies the user's informational need. This facilitates a contextual analysis of search result sets by the user, and eliminates the need for the user to open multiple display tabs or active windows to review the search results.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
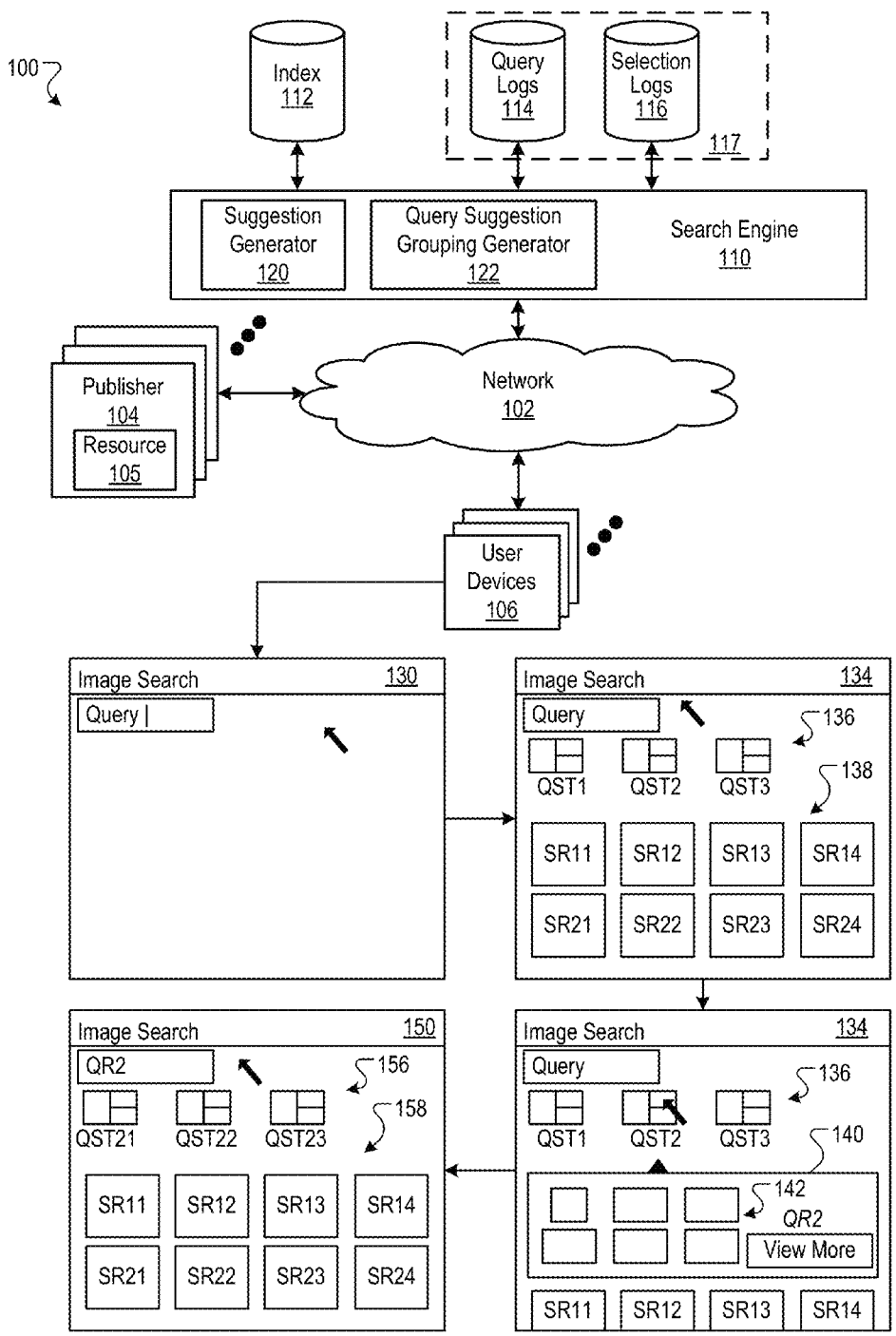
FIG. 1 is a block diagram of an example environment in which image search results are processed.

FIG. 1 is a block diagram of an example environment 100 in which systems implementing the subject matter of this written description are implemented. A network 102, such as a local area network (LAN), a wide area network (WAN), the Internet, or a combination thereof, connects websites 104, user devices 106, and a search system 112.

A website 104 includes one or more resources 105 associated with a domain name and hosted by one or more servers.

An example website is a collection of webpages formatted in hypertext markup language (HTML) that can contain text, images, multimedia content, and programming elements, such as scripts. Each website 104 is maintained by a content publisher, which is an entity that controls, manages and/or owns the website 104.

A resource 105 can be any data that can be provided over the network 102. A resource 105 can be identified by a resource address that is associated with the resource 105. Resources include HTML pages, images, portable document format (PDF) documents, videos, and feed sources, to name only a few. Additionally, resources such as webpage resources can, in turn, reference other resources such as images so that when the webpage resource is rendered on a user device, the referenced image is also displayed.

A user device 106 is an electronic device that is capable of requesting and receiving resources over the network 102. Example user devices 106 include personal computers, mobile communication devices, e.g., smartphones, and other devices that can send and receive data over the network 102. A user device 106 typically includes one or more user applications, such as a web browser, to facilitate the sending and receiving of data over the network 102. By use of these applications, a user device 106 can request resources 105 from a website 104. In turn, the resource 105 can be provided to the user device 106 for presentation by the user device 106.

To facilitate searching of these resources 105, the search engine 110 identifies the resources by crawling the publisher websites 104 and indexing the resources 105 provided by the publisher websites 104. The resources 105 are indexed and the index data are stored in an index 112.

The user devices 106 submit search queries to the search engine 110. In response to the search request, the search engine 110 uses the index 112 to identify resources that are relevant to the queries. The search engine 110 identifies the resources in the form of search results and returns the search results to the user devices 106 in a search results page resource 111. A search result is data generated by the search engine 110 that identifies a resource or provides information that satisfies a particular search query. A search result for a resource can include a webpage title, a snippet of text extracted from the webpage, and a resource locator for the resource, e.g., the URL of a webpage. In the case of images, the search result may include a representative image (e.g., a thumbnail) of the image and the resource locator for the image. For example, the search system 110 utilizes image processing algorithms to identify multiple instances of the same image. The search system 110, in some implementations, then selects a representative image, e.g., a canonical image, that is used to represent each of the identical images, and associates the representative image with each of the underlying identical images. The underlying webpage that is referenced in the image search result is determined at query time, as a particular query may include information that results in one particular webpage being selected over other webpages that include the same image. The search results are ranked based on scores related to the resources identified by the search results, ordered according to these scores, and provided to the user device according to the order.

The search system 110 returns the search result to the user devices 106 in the form of a search results page. The search result page typically includes multiple search results. The user device 106 receives the search results page and renders the page for presentation.

In some implementations, the search queries 109 submitted from user devices 106 are stored in query logs 114. Selection data for the queries and the webpages referenced by the search results and selected by users are stored in selection logs 116. The query logs 114 and the selection logs 116 define search history data 117 that include data from and related to previous search requests associated with unique identifiers. The selection logs represent actions taken responsive to search results provided by the search engine 110. The query logs 114 and selection logs 116 can be used to map queries to resources that were identified in search results and the actions taken by users when presented with the search results in response to the queries. The selection logs 116 and query logs 114 can thus be used by the search engine 110 to determine the respective sequences of queries submitted by the user devices 106, the actions taken in response to the queries, and to generate suggestions to submitted queries.

Often a user may submit more than one query during a search session. This is because a user may often refine a query while searching for information. The search engine 110 includes a suggestion generator to assist users in refining queries. For a particular query input by a user, the search engine 110 may provide one or more suggestions for the search results. A user may select one of the query suggestions to receive search results responsive to the query suggestion.

In some implementations, the search engine 110 includes a query suggestion grouping generator 122 that generates a query suggestion grouping for each query suggestion. Each query suggestion grouping includes data describing the query suggestion and data depicting a representative resource set of resources that are responsive to the query. Illustrations of such groupings for search results are described in more detail below in the context of image search results. However, the groupings can be used for any type of resource search operation. For example, query suggestion groupings can be generated for search suggestions for webpage resource searches, video searches, product searches, book searches, and so on. Thus, the features described below are not limited to image search suggestions.

As shown in FIG. 1, the user device 106 submits a query to the search engine 110 after the user inputs the query on a search interface 130. In response to the query, the search engine 110 returns a search results page 134 that includes query suggestion groupings 136 and search results 138. In some implementations, that query suggestion groupings 136 are arranged in a row above search results 138. The search results 138 can be provided in the form of a list, such as in the case of search results for webpages, or, as shown in FIG. 1, in the form of rows, such as in the case of images or videos. Other arrangements of query suggestion groupings can also be used, however.

Figure 2A:
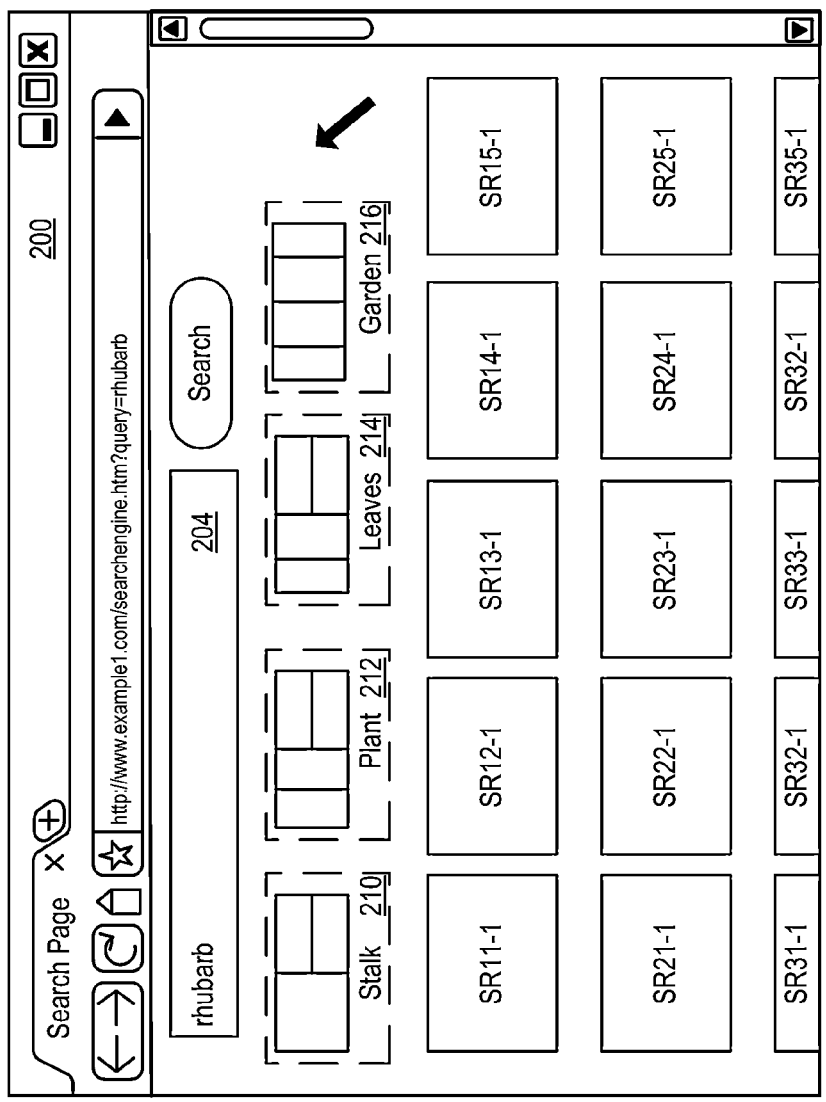
FIGS. 2A-2C are illustrations of example user interfaces presented during the processing of a query suggestion grouping.

A more detailed diagram of an example search results page with query suggestions is shown in FIG. 2A. In FIG. 2A, the query 204 [rhubarb] is input for a search of an image corpus. The query suggestion groupings 210, 212, 214 and 216 are arranged in a row above the rows of image search results SR11-1-SR35-1. Each image search result references a corresponding image resource that is determined to be responsive to a search query and includes a representative image of the image resource. For example, each image shown in the search results of the search results page 200 may be a smaller version of a corresponding image provided by various websites 104. Each search result references a page resource 105 that includes the image resource. The page resource may, in some situations, be the same as the image resource; alternatively, the page resource may be an HTML page that references the image resource so that when the HTML page is rendered on a user device, the image is displayed with additional content.

Each query suggestion grouping in FIG. 2A includes text describing the query suggestion and image data depicting a representative image set of images. Each image in the representative image set is responsive to the query suggestion. For example, as shown in FIG. 2A, for the query [rhubarb], query suggestion groupings for the query suggestions [rhubarb stalk], [rhubarb plant], [rhubarb leaves] and [rhubarb garden] are shown. In some implementations, the textual data describing the query suggestion is non-duplicative of text of the search query. For example, as shown in FIG. 2A, for the query [rhubarb], only the text "stalk," "plant," "leaves" and "garden" are shown for the query suggestions [rhubarb stalk], [rhubarb plant], [rhubarb leaves] and [rhubarb garden], respectively.

The query suggestion grouping generator can determine non-duplicative text in a variety of ways. For example, one way is to eliminate all terms that appear in the original query. Another way is to identify distinct semantic entities, such as n-grams that have an associated information gain, within the query suggestion, and provide the n-gram as the textual data describing the query suggestion. In the case of the latter, one or more terms in the original query may appear in the textual data describing the query suggestion, but only those terms that are necessary to specify the distinct semantic entity are included. Thus, in the latter case, non-duplicative text does not necessarily require mutually exclusive terms. For example, consider the query directed to a famous person, e.g., [Ima Starr now]. One query suggestion may be [Ima Starr now and then]. Because the tri-gram "now and then" is a distinct semantic entity, the text describing the query refinement [Ima Starr now and then] is "now and then" and not "and then."

For image search results, the data depicting the image set can include thumbnails of responsive images. The thumbnails are arranged in various geometric configurations as shown in FIG. 2A. The configurations may vary based on, for example, the aspect ratio of the images and the ranking of the images in response to each query suggestion, and the number of thumbnail representations that can fit in an allotted area A without undergoing a maximum scaling reduction Z. For example, for the query suggestion [rhubarb stalk], the top three ranked images may be a first image having a square aspect ratio, and second and third images that each have a 2×4 aspect ratio. Likewise, for the query suggestion [rhubarb plant], the top four ranked images may be first and second images that each have a 2×4 aspect ratio, and third and fourth images that each have a 4×2 aspect ratio. For the first grouping 210, the thumbnails are of such aspect ratios that only three thumbnails fit into the allotted area A without exceeding the scaling reduction Z. However, for the second grouping 212, the thumbnails are of such aspect ratios that four thumbnails fit into the allotted area A without exceeding the scaling reduction Z.

For the query grouping 210, the thumbnails may be of images of rhubarb stalks; for the grouping 212, the thumbnails may be of rhubarb plants; and so on. The representative image set may be a single thumbnail image generated from respective images, or, alternatively, may be a set of separate thumbnails that are rendered in an adjacently joined set to form a single grouping.

In some implementations, the representative image set depicting a subset of a respective set of images determined to be responsive to the search query suggestion is selected such that none of the images in the representative image is an image depicted in the search results SR11-1-SR35-1 shown on the search results page. The selection of the representative image set is described with reference to FIG. 3 below.

A user may select a query suggestion grouping to evaluate the query suggestion. As shown in FIG. 1, the user has selected the second query suggestion grouping that includes the query suggestion textual description QST2. In response to a selection of a particular query suggestion grouping, the user device executes instructions within the search results page 134 that cause the user device to generate a query suggestion display environment 140 on the search results page 134. For example, the query suggestion display environment 140 is generated between the first row in which the query suggestions groupings 136 are shown and the first row of the image search results 138. As a result, the image search results 138 are pushed downward, and some of the search results 138 may move out of the view port, as shown.

The query suggestion display environment displays at least the subset 142 of the respective set of images determined to be responsive to the query suggestion for which the query suggestion grouping is selected, and at least the textual data describing the query suggestion. For example, as shown in FIG. 1, the environment 140 includes six thumbnails and the entire query suggestion QR2.

Figure 2B:
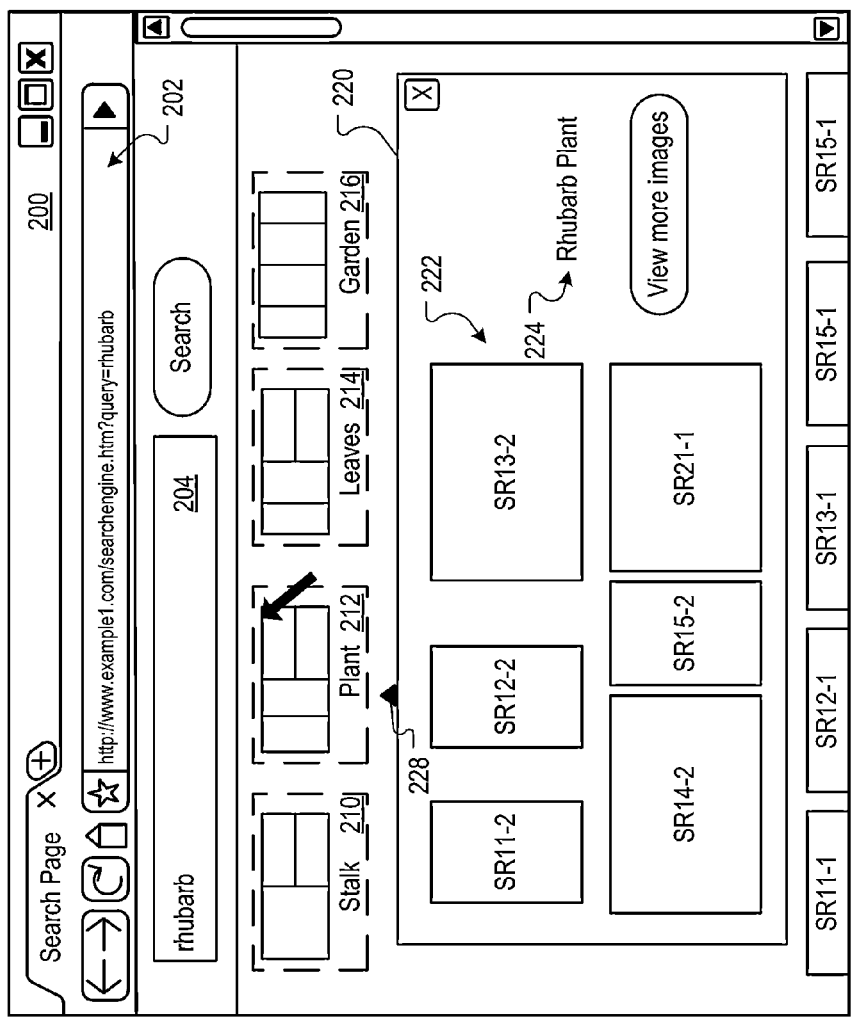

FIG. 2B is a more detailed illustration of the search results page displaying the query suggestion display environment. In FIG. 2B, the user has selected the query suggestion grouping 212. The selection can be, for example, the result of a hover in excess of a hover time, a click on the query suggestion grouping 212, or some other signal of user selection or interest. In response to the selection, the query suggestion display environment 220 is generated adjacent to the query suggestion groupings. An indicator 228 on the display environment 220 border indicates the query suggestion grouping the first row to which the image display environment 220 corresponds.

The query suggestion display environment 220 includes search results 222 and the query suggestion 224. In some implementations, the search results 222 that are shown are the top N search results for the query suggestion 224, and include images for search results that were depicted in the query suggestion grouping for which the query suggestion environment 220 was generated. For example, as shown in FIG. 2B, the images for the search results SR11-2-SR14-2 are represented by thumbnails in the query suggestion grouping 212. In some implementations, selection of one of the search results 222 causes the user device to request the image depicted in the search result, or, alternatively, request the webpage resource that includes the image depicted in the search result. Selecting the "View more images" button, or clicking on the query suggestion grouping 212 when the display environment 220 is open, causes the user device to submit the query suggestion to the search engine as a query. For example, assume the user is interested in the search results shown in the environment 220, and desires to see additional search results. The user can select either "View more images" button and a new search results page will be generated, such as the search results page 150 shown FIG. 1. The search results page 150 includes the query suggestion QR2 as the input query, and the search results 158 are responsive to the query suggestion. Furthermore, additional query groupings 156 are generated for the query QR2.

Figure 2C:
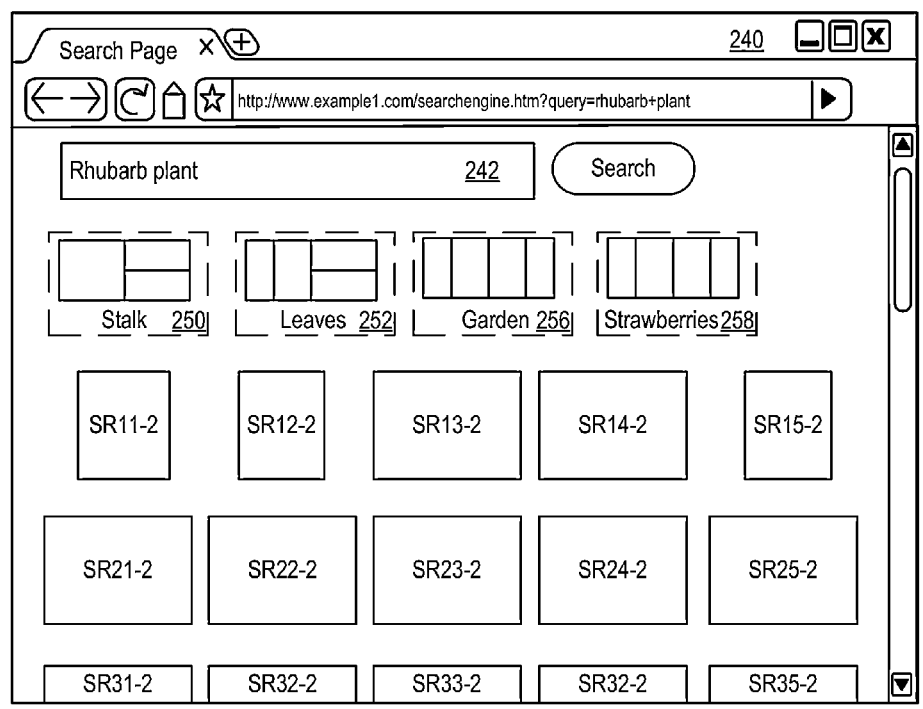

FIG. 2C is a more detailed illustration of a search results page 240 resulting from a selection of a query suggestion grouping. The search results page 240 is similar to the search results page 200, except that the query suggestion groupings 250, 252, 256 and 258 differ from the query suggestion groupings 210, 212, 214 and 216, as do the underlying search results.

Figure 3:
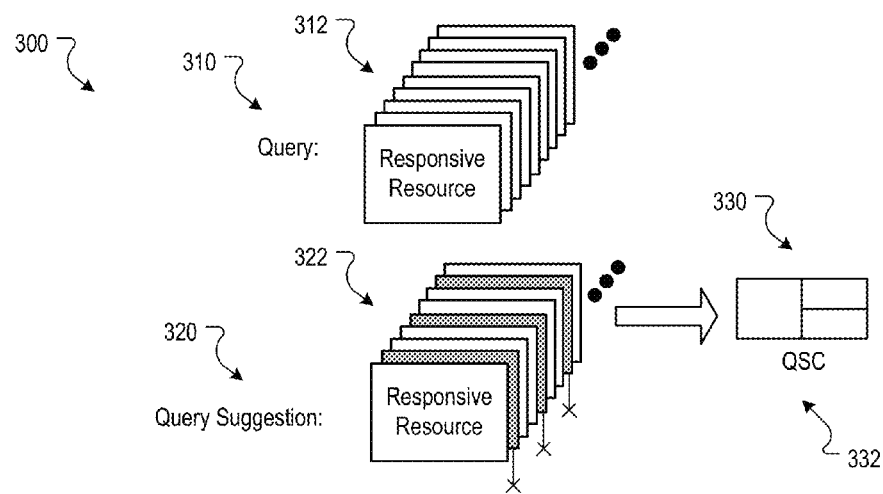
FIG. 3 is a block diagram illustrating the selection of a representative resource set.
Figure 4:
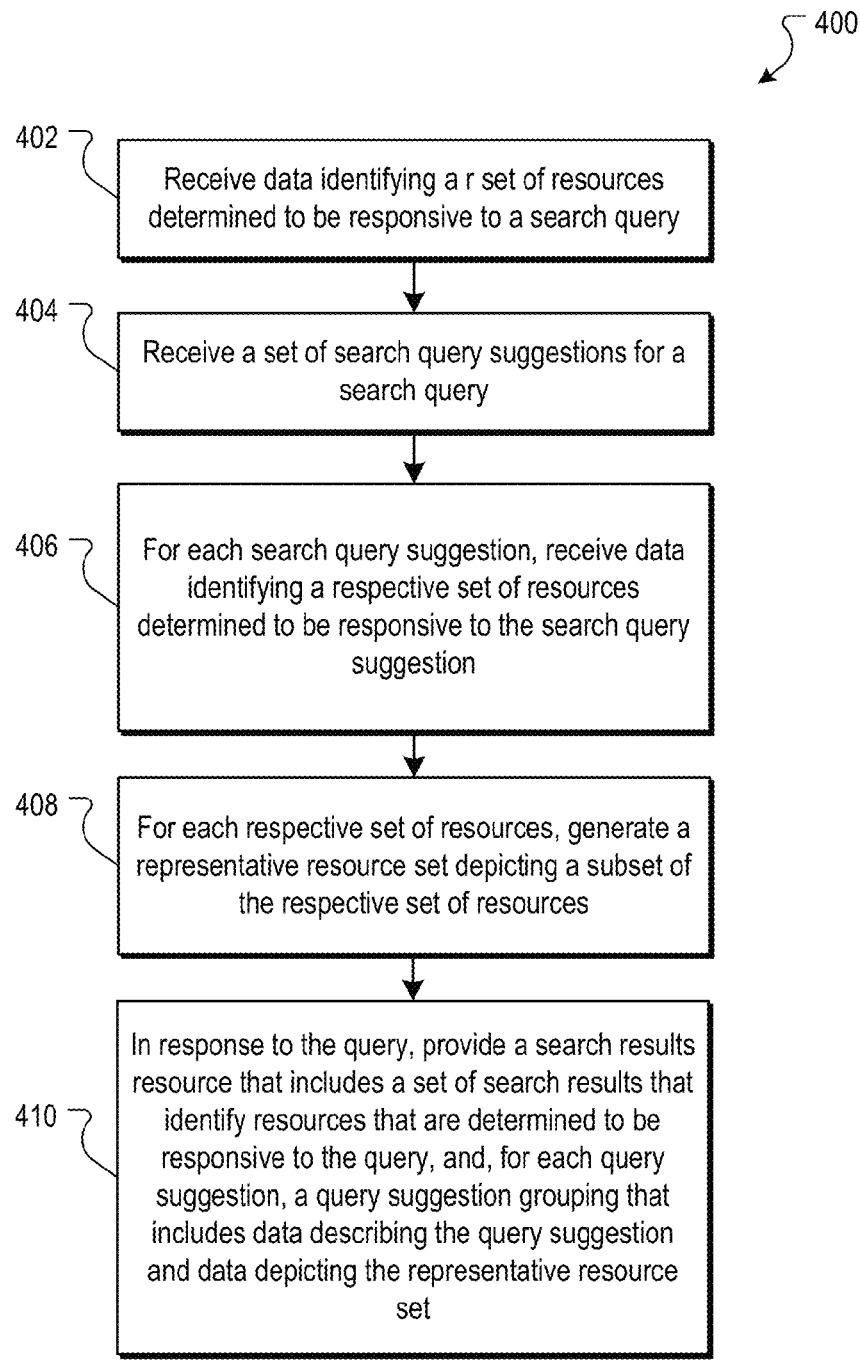
FIG. 4 is a flowchart of an example process for generating and providing query suggestion groupings.

FIG. 3 is a block diagram 300 illustrating the selection of a representative content item set. The process attendant to the block diagram is described with respect to FIG. 4. In some implementations, the process 400 of FIG. 4 is run at query time each time a query is received. In other implementations, portions of the process may be run periodically for a set of most popular queries received by the search engine. The run time selected may be a time during which system resource requirements are relatively low, e.g., during early morning hours. The resulting query suggestion groupings are thus predetermined and pre-cached for various popular queries, and when a query is received at query time, the corresponding pre-cached query suggestion groupings can be fetched from memory. The frequency at which the query suggestion groupings are determined can be based on one of various predefined periods, e.g., daily, weekly, etc.

For a particular query 310 input by a user, the query suggestion grouping generator 122 receives data identifying resources 312 responsive to the query (402). Examples of such data can be the URL of the resource, or a search result that includes the URL of the resource and data from the resource, such as a snippet of text or a thumbnail, or other data that can be used to identify the resource.

For the search query, the query suggestion grouping generator 122 receives a set of search query suggestions for the search query (404). Each of the search query suggestion 312 is based on the search query 310 and is different from the query 310. A variety of appropriate search query suggestion processes can be used to generate search query suggestions. In FIG. 3, one query suggestion 320 is shown to avoid congestion in the drawing.

For each search query suggestion 320, the query suggestion grouping generator 122 receives data identifying a respective set of resources 322 determined to be responsive to the search query suggestion (406). Again, examples of such data can be the URL of the resource, or a search result that includes the URL of the resource and data from the resource, such as a snippet of text or a thumbnail, or other data that can be used to identify the resource. The data identifying the resources also specifies a ranking of the resources in response to the query, where each resource is ranked according to an ordinal position relative to other resources that are responsive to the query.

For each respective set of responsive resources 322, the query suggestion grouping generator 122 generates a representative resource set 330 depicting a subset of the respective set of resources (408). The query suggestion grouping also includes textual data 332 as described above.

In some implementations, the query suggestion grouping generator 122 selects the top N ranked resources. The value of N may be predefined, e.g., 3, 4, or 5, for example, or may vary depending on the aspect ratios that are required to depict each resource and the amount of area available in which the representative resource set can be depicted.

In some implementations, the resources that are selected to generate the representative set can be selected from the respective resources that are not identified in the top M search results for the query, where M is greater than N. For example, M may be 20, 30 or 40, or some other value. As shown in FIG. 3, the responsive resources 322 that are shaded are resources that are also within the top M resources 312 for the query 310. Accordingly, these resources are not used to generate the representative set 330 for the query grouping, as indicated by the "x" detail respectively descending from each of the resources.

In some implementations, a query suggestion grouping for a query suggestion is only generated if the resources 322 for the query suggestion do not meet an overlap threshold with the resources 312 for the query 310 for the top M resources in both sets 312 and 322. For example, assume that the overlap threshold is a predefined percentage. If more than a predefined percentage of the responsive resources 322 overlap with the resources 312 within the top N resources, then a query grouping will not be generated for the query suggestion, nor will the query suggestion be provided in response to the query.

In some implementations, the resources that are selected to generate the representative set can be selected from any of the respective resources as long as the overlap threshold is not met. Other appropriate ways of selecting resources can also be used.

In response to the query, the search engine 110 provides a search results resource that includes a set of search results that identify resources that are determined to be responsive to the query, and, for each query suggestion, a query suggestion grouping that includes data describing the query suggestion and data depicting the representative resource set (410). For example, a search results page such as the search results page 200 of FIG. 2A is provided to a user device from which the query was received.

While the query suggestion groupings described above are for a particular query, e.g., a most recent query, the query suggestion groupings can be based on several or more previous queries for a particular user device or user session. For example, the query suggestion grouping include one grouping for a query suggestion for a most recently input query, and one or more groupings for one or more queries input prior to the most recently input query.

While the query suggestion groupings described above are for query suggestions and correspondingly responsive search results, other types of query suggestion groupings can also be generated. For example, the query suggestion grouping may include a link to a website that is different from the search engine and that includes a collection of resources that may be of interest to the user. Thus, the query suggestion may be descriptive of a content collection, and the representative resource set may be a subset of a collection of resources that belong to the content collection.

FIG. 4 is an illustration of query suggestion groupings that include a website grouping as one of the query suggestion groupings. For the query [Geometric Art], two query suggestion groupings 500 and 510 as described above are generated by the query suggestion grouping generator 122. However, a third query suggestion grouping 520 that includes a link to a website that is different from the search engine is generated. For example, the artist "John Doe" may be an artist that creates geometric shaped art, and there may be a particular website that features images of his collection. Thus, in some implementations, the query suggestion grouping generator 122 generates a grouping that is descriptive of the content of the collection available at the website. Selection of the query suggestion grouping will cause the display environment to display resources from the collection. The display environment may also include a link to the web site at which the collection is hosted.

The query suggestion grouping generator 122 can utilize a variety of appropriate processes can be used to determine whether a query suggestion grouping should reference responsive resources form a hosted collection at a particular website or domain rather than individual resources from different sites. For example, for a particular query suggestion, e.g., [Geometric Art John Doe], the query suggestion grouping generator 122 determines a diversity measure that measures the domain diversity of respective domains on which the top K resources responsive to the query are hosted. For example, the domain diversity score may be a ratio of the number of resources J in the top K resources hosted on a host that belongs to the particular domain, e.g., J/K. If the ratio exceeds a percentage, then the query suggestion grouping generator 122 generates a grouping that is descriptive of the content of the collection available at the website belonging to the domain.

In another implementation, a page diversity score can be used. The page diversity score is similar to the domain diversity score, and is a ratio of the number of resources J in the top K resources hosted on a particular webpage. For example, the "John Doe Collection 2103" may depicted by a set of images that are displayed on a single webpage.

To calculate the diversity score, query suggestion grouping generator 122 identifies a common address unit for each resource and groups the resources by the common address units. A common address unit may be, for example, a domain name, a complete URL, etc. Furthermore, multiple diversity checks for different common address unit types can be done simultaneously. For each common address unit that has a diversity score that meets a threshold, a query suggestion grouping can be generated.

Figure 5:
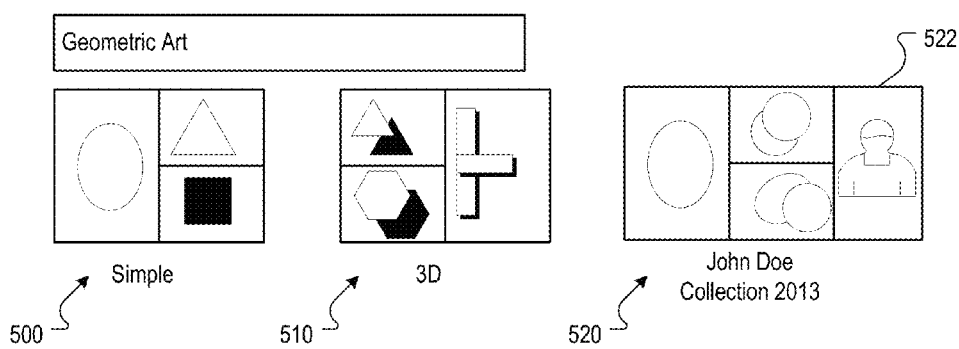
FIG. 5 is an illustration of query suggestion groupings that include a website grouping.

Additional information can also be included in the query suggestion grouping. For example, as shown in FIG. 5, instead of the query suggestion [Geometric Art John Doe], the description [John Doe Collection 2013] is shown. The description can be, for example, taken from a webpage title, derived from links to the webpage or site, or from some other source. Likewise, the data depicting the representative resource set also includes an image 522 of the author John Doe. The image may be selected based on either its relative importance and responsiveness to the query suggestion [Geometric Art John Doe] or relative importance in the collection of images within the webpage or web site at which the images are located.

In another implementation, the query suggestion grouping can be a collection of images from a particular web page, and the web page is selected when a search score (or ranking) of the web page meets a minimum scoring (or ranking) threshold.

In yet another implementation, the query suggestion grouping can describe a particular feature of a collection of images that are responsive to the query or the query suggestion. For example, a particular set of images relating to the same topic (e.g., the Eiffel Tower), may be processed to identify distinct visual features by which the set of images may be partitioned. For example, the distinct visual features may be black and with images, sepia tone images, images taken at night, images taken in full sunlight, etc. Each query suggestion grouping may thus include a visual and textual description of the visual features, e.g., images in black and white may include black and white thumbnails and include the text "Black and White", and so on. Image metadata may also be processed to partition a set of images. For example, images may be portioned by photographic date ranges, by image size, by location from which the photographs were taken, etc.

In still other implementations, query suggestion groupings can include data from entity relations of a knowledge graph. For example, an entity may be a particular author, and the knowledge graph may include a list of books authored by the author. Accordingly, the query suggestion grouping may include an image of the author, images of books authored by the author, and text describing the content of the grouping, e.g., "Books by Jane Doe."

Figure 6:
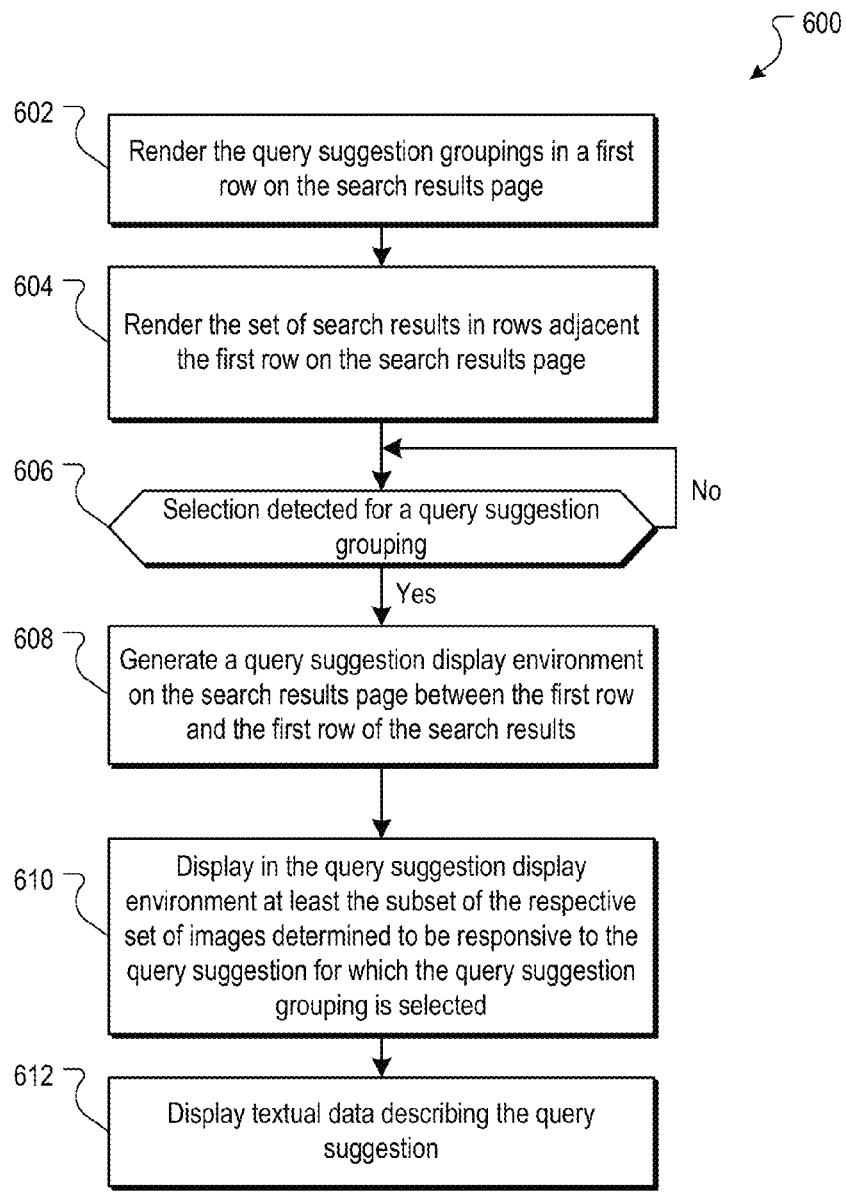
FIG. 6 is a flowchart of an example process for processing query suggestion groupings at a user device.

FIG. 6 is a flowchart of an example process 600 for processing query suggestion groupings at a user device. The operations are caused by the user device executing instructions included in the search results page resource.

The user device renders the query suggestion groupings in a first row on the search results page (602). For example, as shown in FIG. 2, the query suggestion groupings can be rendered above the search results and below the query input field. Alternatively, the query suggestion groupings can be rendered vertically on a side of the search results page, or at the bottom of the search results page, or in between a set of rows of search results.

The user device renders the set of search results in rows adjacent the first row on the search results page (604). The row can include columns, such as in the case of image search results, or can be single elements, such as in the case of webpage (textual) search results.

The user device monitors for a selection of a query suggestion grouping (606). For example, the user device monitors for a mouse over or hover over a search query suggestion grouping.

In response to a selection of a search query suggestion grouping, the user device generates a query suggestion display environment on the search results page between the first row and the first row of the search results (608). For example, a display environment as depicted in FIG. 2B is generated.

The user device displays, in the display environment, at least the subset of the respective set of resources determined to be responsive to the query suggestion for which the query suggestion grouping is selected (610). For example, representations of the resources (or the actual resources, depending on the type of resource being searched) may be displayed as search results 222 as depicted in FIG. 2B.

The user device displays textual data describing the query suggestion (612). For example, the entire search query suggestion may be displayed as shown in FIG. 2B.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, e.g., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program, also known as a program, software, software application, script, or code, can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending webpages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device. Data generated at the user device, e.g., a result of the user interaction can be received from the user device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by a data processing apparatus, the method comprising:
   receiving, in response to a search query for resources received from a user device, a set of search query suggestions, each search query suggestion being based on the search query and different from the search query;
   for each search query suggestion, receiving data identifying a respective set of resources determined to be responsive to the search query suggestion, wherein the resources are images and each respective set of resources is a respective set of images determined to be responsive to the search query suggestion;
   for each respective set of resources, generating a representative resource set depicting a subset of the respective set of resources by generating a representative image set depicting a subset of the respective set of images determined to be responsive to the search query suggestion and that are not identified as images determined to be responsive in a set of top ranked images responsive to the query;
   providing to the user device, in response the search query, a search results page resource, the search results page resource including instructions that cause the user device to render a search results page that includes:
      a set of search results that identify resources that are determined to be responsive to the search query, each search result being an image search result that identifies an image determined to be responsive to the query and the set of search results identify the set of top ranked images responsive to the query;
      for each search query suggestion, a search query suggestion grouping including:
         data describing the search query suggestion, wherein the data describing the search query suggestion is textual data describing the search query suggestion and that is non-duplicative of text of the search query; and
         data depicting the representative resource set, wherein the data is image data depicting the representative image set.

2. The method of claim 1, wherein generating a representative image set depicting a subset of the respective set of images comprises, for each respective set of images, generating a thumbnail image that depicts the representative image set depicting a subset of the respective set of images.

3. The method of claim 1, wherein the search results page resource includes instructions that cause the user device to:
   render the search query suggestion groupings in a first row on the search results page;
   render the set of image search results in rows adjacent the first row on the search results page; and
   in response to a selection of a particular search query suggestion grouping:
      generating a query suggestion display environment on the search results page between the first row and the rows of the image search results;
      display in the query suggestion display environment at least the subset of the respective set of images determined to be responsive to the search query suggestion for which the search query suggestion grouping is selected; and
      display at least the textual data describing the search query suggestion.

4. The method of claim 3, wherein the query suggestion display environment includes a user interface element for selecting the search query suggestion, and upon such selection causes the user device to request a search results page for image search results that includes image search results responsive to the search query suggestion.

5. A system, comprising:
   a data processing apparatus; and
   a memory storage device storing instructions executable by the data processing apparatus and that upon such execution cause the data processing apparatus to perform operations comprising:
   receiving, in response to a search query for resources received from a user device, a set of search query suggestions, each search query suggestion being based on the search query and different from the search query;
   for each search query suggestion, receiving data identifying a respective set of resources determined to be responsive to the search query suggestion, wherein the resources are images and each respective set of resources is a respective set of images determined to be responsive to the search query suggestion;
   for each respective set of resources, generating a representative resource set depicting a subset of the respective set of resources by generating a representative image set depicting subset of the respective set of images determined to be responsive to the search query suggestion and that are not identified as images determined to be responsive in a set of top ranked images responsive to the query;
   providing to the user device, in response the search query, a search results page resource, the search results page resource including instructions that cause the user device to render a search results page that includes:
      a set of search results that identify resources that are determined to be responsive to the search query, each search result being an image search result that identifies an image determined to be responsive to the query and the set of search results identify the set of top ranked images responsive to the query;
      for each search query suggestion, a search query suggestion grouping including:
         data describing the search query suggestion, wherein the data describing the search query suggestion is textual data describing the search query suggestion and that is non-duplicative of the text of the search query; and
         data depicting the representative resource set, wherein the data is image data depicting the representative image set.

6. The system of claim 5, wherein generating a representative image set depicting a subset of the respective set of images comprises, for each respective set of images, generating a thumbnail image that depicts the representative image set depicting a subset of the respective set of images.

7. The system of claim 5, wherein the search results page resource includes instructions that cause the user device to:
- render the search query suggestion groupings in a first row on the search results page;
- render the set of image search results in rows adjacent the first row on the search results page; and
- in response to a selection of a particular search query suggestion grouping:
  - generating a query suggestion display environment on the search results page between the first row and the rows of the image search results;
  - display in the query suggestion display environment at least the subset of the respective set of images determined to be responsive to the search query suggestion for which the search query suggestion grouping is selected; and
  - display at least the textual data describing the search query suggestion.

8. The system of claim 5, wherein the query suggestion display environment includes a user interface element for selecting the search query suggestion, and upon such selection causes the user device to request a search results page for image search results that includes image search results responsive to the search query suggestion.

9. A memory storage device storing instructions executable by a data processing apparatus and that upon such execution cause the data processing apparatus to perform operations comprising:
- receiving, in response to a search query for resources received from a user device, a set of search query suggestions, each search query suggestion being based on the search query and different from the search query;
- for each search query suggestion, receiving data identifying a respective set of resources determined to be responsive to the search query suggestion, wherein the resources are images and each respective set of resources is a respective set of images determined to be responsive to the search query suggestion;
- for each respective set of resources, generating a representative resource set depicting a subset of the respective set of resources by generating a representative image set depicting a subset of the respective set of images determined to be responsive to the search query suggestion and that are not identified as images determined to be responsive in a set of top ranked images responsive to the query;
- providing to the user device, in response the search query, a search results page resource, the search results page resource including instructions that cause the user device to render a search results page that includes:
  - a set of search results that identify resources that are determined to be responsive to the search query, each search result being an image search result that identifies an image determined to be responsive to the query and the set of search results identify the set of top ranked images responsive to the query;
  - for each search query suggestion, a search query suggestion grouping including:
    - data describing the search query suggestion, wherein the data describing the search query suggestion is textual data describing the search query suggestion and that is non-duplicative of the text of the search query; and
    - data depicting the representative resource set, wherein the data is image data depicting the representative image set.

10. The memory device of claim 9, wherein generating a representative image set depicting a subset of the respective set of images comprises, for each respective set of images, generating a thumbnail image that depicts the representative image set depicting a subset of the respective set of images.

* * * * *